United States Patent
Aron et al.

(10) Patent No.: US 12,381,833 B2
(45) Date of Patent: *Aug. 5, 2025

(54) DISTRIBUTED FAIR ALLOCATION OF SHARED RESOURCES TO CONSTITUENTS OF A CLUSTER

(71) Applicant: Cohesity, Inc., San Jose, CA (US)

(72) Inventors: Mohit Aron, Saratoga, CA (US); Vinay Reddy, San Jose, CA (US); Ravi Gadde, Los Altos, CA (US)

(73) Assignee: Cohesity, Inc., Santa Clara, CA (US)

( * ) Notice: Subject to any disclaimer, the term of this patent is extended or adjusted under 35 U.S.C. 154(b) by 491 days.

This patent is subject to a terminal disclaimer.

(21) Appl. No.: 17/501,643

(22) Filed: Oct. 14, 2021

(65) Prior Publication Data

US 2022/0124049 A1  Apr. 21, 2022

Related U.S. Application Data

(63) Continuation of application No. 15/852,608, filed on Dec. 22, 2017, now Pat. No. 11,178,070, which is a continuation of application No. 14/332,154, filed on Jul. 15, 2014, now Pat. No. 9,887,937.

(51) Int. Cl.
  *G06F 15/16* (2006.01)
  *H04L 47/70* (2022.01)
  *H04L 9/40* (2022.01)
  *H04L 67/1001* (2022.01)

(52) U.S. Cl.
  CPC .............. *H04L 47/827* (2013.01); *H04L 9/40* (2022.05); *H04L 47/821* (2013.01); *H04L 67/1001* (2022.05)

(58) Field of Classification Search
  CPC ........ H04L 47/827; H04L 9/40; H04L 47/821
  See application file for complete search history.

(56) References Cited

U.S. PATENT DOCUMENTS

| | | |
|---|---|---|
| 5,551,046 A | 8/1996 | Mohan |
| 6,047,323 A | 4/2000 | Krause |
| 6,108,654 A | 8/2000 | Chan |
| 6,195,678 B1 | 2/2001 | Komuro |
| 6,529,983 B1 | 3/2003 | Marshall |
| 6,757,769 B1 | 6/2004 | Ofer |

(Continued)

OTHER PUBLICATIONS

International Search Report and Written Opinion dated Sep. 30, 2015 for Application No. PCT/US2015/040179.

(Continued)

*Primary Examiner* — Razu A Miah
(74) *Attorney, Agent, or Firm* — Shumaker & Sieffert, P.A.

(57) ABSTRACT

Techniques are disclosed for allocating shared resources to nodes in a distributed computing network system. Nodes request a lock for each instance of a computing resource (e.g., a virtual IP address associated with a service provided by the distributed computing network system) from a distributed lock manager. The distributed lock manager maintains a queue of requests for each instance of the shared resource. Upon receiving a lock from the distributed lock manager, the receiving node performs a fairness allocation protocol to determine whether to accept the lock. If so determined, the shared computing resources associated with the lock is configured.

11 Claims, 9 Drawing Sheets

(56) References Cited

U.S. PATENT DOCUMENTS

| | | |
|---|---|---|
| 6,973,549 B1 | 12/2005 | Testardi |
| 7,209,990 B2 | 4/2007 | Pruscino |
| 7,406,473 B1 | 7/2008 | Brassow |
| 7,418,500 B1 | 8/2008 | Bolinger |
| 7,433,951 B1 | 10/2008 | Waldspurger |
| 8,589,560 B1 | 11/2013 | Liu |
| 8,762,531 B1 | 6/2014 | Yemini |
| 9,456,053 B2 | 9/2016 | Newton |
| 11,178,070 B2 | 11/2021 | Aron et al. |
| 2002/0147840 A1 | 10/2002 | Mutton |
| 2002/0174227 A1 | 11/2002 | Hartsell |
| 2002/0199014 A1 | 12/2002 | Yang |
| 2003/0046369 A1 | 3/2003 | Sim |
| 2003/0105829 A1 | 6/2003 | Hayward |
| 2003/0105868 A1 | 6/2003 | Kimbrel |
| 2003/0109272 A1 | 6/2003 | Mousseau |
| 2003/0187993 A1 | 10/2003 | Ribot |
| 2004/0030755 A1 | 2/2004 | Koning |
| 2005/0013280 A1 | 1/2005 | Buddhikot |
| 2005/0193113 A1 | 9/2005 | Kokusho |
| 2006/0206901 A1 | 9/2006 | Chan |
| 2006/0221823 A1 | 10/2006 | Shoham |
| 2006/0224805 A1* | 10/2006 | Pruscino ............... G06F 9/526 710/200 |
| 2008/0222642 A1 | 9/2008 | Kakarla |
| 2009/0025006 A1 | 1/2009 | Waldspurger |
| 2009/0106404 A1 | 4/2009 | Christenson |
| 2009/0172167 A1 | 7/2009 | Drai |
| 2009/0307466 A1 | 12/2009 | Barsness |
| 2009/0327854 A1 | 12/2009 | Chhajer |
| 2010/0057741 A1 | 3/2010 | Fincher |
| 2010/0061309 A1 | 3/2010 | Buddhikot |
| 2011/0078318 A1 | 3/2011 | Desai |
| 2011/0131193 A1 | 6/2011 | Pasupuleti |
| 2011/0161281 A1 | 6/2011 | Sayyaparaju |
| 2012/0071188 A1 | 3/2012 | Wang |
| 2012/0173499 A1* | 7/2012 | Walker ............... G06F 9/466 707/704 |
| 2012/0259820 A1 | 10/2012 | Patwardhan |
| 2012/0310881 A1 | 12/2012 | Shadmon |
| 2013/0160008 A1 | 6/2013 | Cawlfield |
| 2013/0173809 A1 | 7/2013 | Hueter |
| 2013/0198319 A1 | 8/2013 | Shen |
| 2014/0236745 A1 | 8/2014 | Vautour |
| 2014/0365549 A1 | 12/2014 | Jenkins |
| 2015/0280959 A1 | 10/2015 | Vincent |
| 2016/0021026 A1 | 1/2016 | Aron |

OTHER PUBLICATIONS

International Preliminary Report on Patentability from International Application No. PCT/US2015/040179 dated Jan. 17, 2017, 6 pp.

Prosecution History from U.S. Appl. No. 14/332,154, now issued U.S. Pat. No. 9,887,937, dated Apr. 8, 2016 through Oct. 11, 2017, 115 pp.

Prosecution History from U.S. Appl. No. 15/852,608, now issued U.S. Pat. No. 11,178,070, dated Oct. 16, 2019 through Jul. 26, 2021, 143 pp.

* cited by examiner

DISTRIBUTED FAIR ALLOCATION OF SHARED RESOURCES TO CONSTITUENTS OF A CLUSTER

CROSS REFERENCE TO OTHER APPLICATIONS

This application is a continuation of U.S. patent application Ser. No. 15/852,608 entitled DISTRIBUTED FAIR ALLOCATION OF SHARED RESOURCES TO CONSTITUENTS OF A CLUSTER filed Dec. 22, 2017, which is a continuation of U.S. patent application Ser. No. 14/332,154, now U.S. Pat. No. 9,887,937, entitled DISTRIBUTED FAIR ALLOCATION OF SHARED RESOURCES TO CONSTITUENTS OF A CLUSTER filed Jul. 15, 2014, each of which is incorporated herein by reference for all purposes.

BACKGROUND

Field

Embodiments presented herein generally relate to distributed computing. More specifically, embodiments presented herein provide techniques for allocating shared resources to members of a computing cluster.

DESCRIPTION OF THE RELATED ART

A distributed computing system includes multiple computer systems which interact with one another to achieve a common goal. The computer systems are networked to form a cluster. Computer systems in the cluster may share different resources, such as data, storage, processing power, and the like.

An example of a distributed computing system is a secondary storage environment. A cluster of secondary storage systems may provide services for primary storage systems. For instance, secondary storage systems may provide backup, copy, and test and development services for data residing in primary storage. In a distributed secondary storage environment, different systems, or nodes, may generally be responsible for different services.

Each node is assigned a physical IP address. The physical IP address allows nodes to identify other nodes and communicate with one another. However, to access the nodes externally (e.g., to access services provided by cluster), each node may be assigned one or more virtual IP (VIP) addresses. In doing so, data sent to a given VIP address may be routed to the node associated with the address. This approach allows secondary storage services to be accessed externally by the VIP address rather than the physical IP address of the node generally responsible for providing the service. Therefore, if the node fails, the VIP address may be reassigned to a live node in the cluster so that transactions sent to that VIP address do not fail.

Present techniques for allocating shared resources, such as VIP addresses, in a distributed computing network system are typically centralized. In one such approach, nodes in a cluster may elect a master node that is responsible for distributing the VIP addresses and persisting the distribution to the other nodes. Such an approach relies on a centralized master node. If the master node fails, the cluster nodes perform the same election algorithm to appoint a new master node. Once appointed, the master node must determine a new distribution and persist that distribution to the other nodes.

SUMMARY

Embodiments presented herein provide a method for allocating shared computing resources in a distributed computing cluster. The method may generally include requesting, from a distributed lock manager, a lock for each instance of a computing resource. The distributed lock manager maintains a queue of requests for each instance of the shared resource. Upon receiving a lock from the distributed lock manager, a fairness allocation protocol is performed to determine whether to accept the lock. If so determined, the shared computing resources associated with the lock is configured.

Another embodiment includes a system having a processor and memory storing a program, which, when executed on a processor, performs an operation for allocating shared computing resources in a distributed computing cluster. The operation may generally include requesting, from a distributed lock manager, a lock for each instance of a computing resource. The distributed lock manager maintains a queue of requests for each instance of the shared resource. Upon receiving a lock from the distributed lock manager, a fairness allocation protocol is performed to determine whether to accept the lock. If so determined, the shared computing resources associated with the lock is configured.

Still another embodiment includes a computer-readable medium storing instructions that, when executed by a processor, cause the processor to perform an operation for allocating shared computing resources in a distributed computing cluster. The operation may generally include requesting, from a distributed lock manager, a lock for each instance of a computing resource. The distributed lock manager maintains a queue of requests for each instance of the shared resource. Upon receiving a lock from the distributed lock manager, a fairness allocation protocol is performed to determine whether to accept the lock. If so determined, the shared computing resources associated with the lock is configured.

DETAILED DESCRIPTION OF THE PREFERRED EMBODIMENTS

Embodiments presented herein provide techniques for allocating shared computing resources in a distributed computing network system. In one embodiment, a distributed lock manager service (DLMS) executes on each computer system, or more generally, "node," of a cluster. After electing one of the DLMS on one of the nodes to act as leader, the DLMS issues locks to shared resources to the nodes. In one embodiment, each node requests a lock for each resource (e.g., for each VIP address) but uses a fairness protocol to determine how many locks (and corresponding shared resources to accept). The DLMS places the lock requests in a first-in first-out queue associated with each shared resource. For example, the DLMS may maintain a lock for each VIP address.

When a node receives a lock, the node performs a fairness protocol to determine whether to retain or use the resources associated with the lock. Specifically, the fairness protocol allows a node to determine how many instances of a resource the node should accept. In one embodiment, given N amount of nodes and M instances of a resource, each node receives M/N amount of resources. However, if M is not a multiple of N, then the remainder (i.e., M MOD N) is allocated evenly to the first M MOD N nodes in the ordered list. The fairness protocol ensures that resources are distributed evenly to nodes in the cluster to accept. If the node determines to not accept a given resource instance, then the node releases the associated lock. However, the node then issues a new request for that lock from the DLMS, placing the request for the rejected resources at the back of the queue. That is, each node always has a request for each lock that the node does not currently hold. Doing so allows each instance of the shared resources to always be assigned to one of the nodes in the cluster and for nodes of the cluster to be in a position to take over should one of the nodes fail.

For example, consider virtual IP (VIP) addresses in a distributed secondary storage system. The secondary storage system provides various services, such as backup, copy, and test and development services. Clients can access services provided by the cluster over a network using a hostname or fully qualified domain name (FQDN) of the cluster. A DNS server then load balances requests sent to the cluster by resolving the hostname to a different VIP address for each request.

In one embodiment, each node requests a lock for each VIP address from the DLMS. The DLMS queues the requests for each lock. The DLMS then returns locks to the clients based on the order the requests are received. When a node receives a lock from the DLMS, the node determines the maximum number of VIP addresses to accept. If accepting a lock for a given VIP address exceeds the maximum, then the node releases the lock. Once released, the DLMS distributes the lock to the next node in the queue. Otherwise, the node accepts the VIP address lock, configures the virtual IP address, and advertises the configuration to the cluster, e.g., by broadcasting a gratuitous ARP message. This approach allows each node to ultimately receive a balanced number of locks to VIP addresses, without having to directly communicate or coordinate with one another. Instead, each node simply accepts the locks received by that node, up to a maximum amount and maintains a pending request for locks held by other nodes.

In one embodiment, this approach provides for a quick recovery (e.g., a rapid reassignment of VIP addresses) after a node fails. Generally, if a node goes offline, DLMS releases the locks held by the node. The DLMS then issues a lock for each one released due to a node failure to the next node in the queue. However, if the node returns to the cluster after a short amount of time, it is preferable that the node reacquires the VIP addresses that the node was originally allocated to avoid significant changes regarding which node handles a particular VIP address. In one embodiment, the node reacquires locks to VIP addresses originally held by that node, e.g., after a node (or a process on that node) fails and is restarted after a brief period of time.

In one embodiment, after receiving a new lock, each node checks a liveness state of the nodes in the cluster. If the node detects a decrease in the cluster membership, the node may delay a period of time before performing the fairness protocol (or configuring the resources associated with the lock). After the period, the node again checks the liveness of the cluster to determine whether the cluster membership has changed. If the cluster membership has increased, then the node performs the fairness protocol and releases any excess locks. The node releases the locks in a last-in-first-out order. By doing so, when the node returning to the cluster requests locks from the DLMS, the node acquires locks for the VIP addresses originally held by that node.

Advantageously, embodiments presented herein provide a deterministic approach for allocating a finite amount of shared resources among nodes in a cluster. Further, using a distributed lock manager to distribute locks to the shared resources allows the shared resources to be distributed without relying on a centralized solution. In addition, by including a delay window in performing the fairness protocol, a node that quickly recovers from failure may preserve the original allocation of shared resources to the node.

Note, embodiments are described below using virtual IP (VIP) addresses as a reference example shared resources distributed to computing nodes in a cluster. However, one of ordinary skill in the art will recognize that the techniques described may be applicable in other related contexts. Other examples of shared resources may include files or backup jobs. Further, embodiments are described using a cluster of nodes which provide a distributed secondary storage system. However, one of ordinary skill in the art will recognize that embodiments may be adapted for use with a variety of computing clusters.

Figure 1:
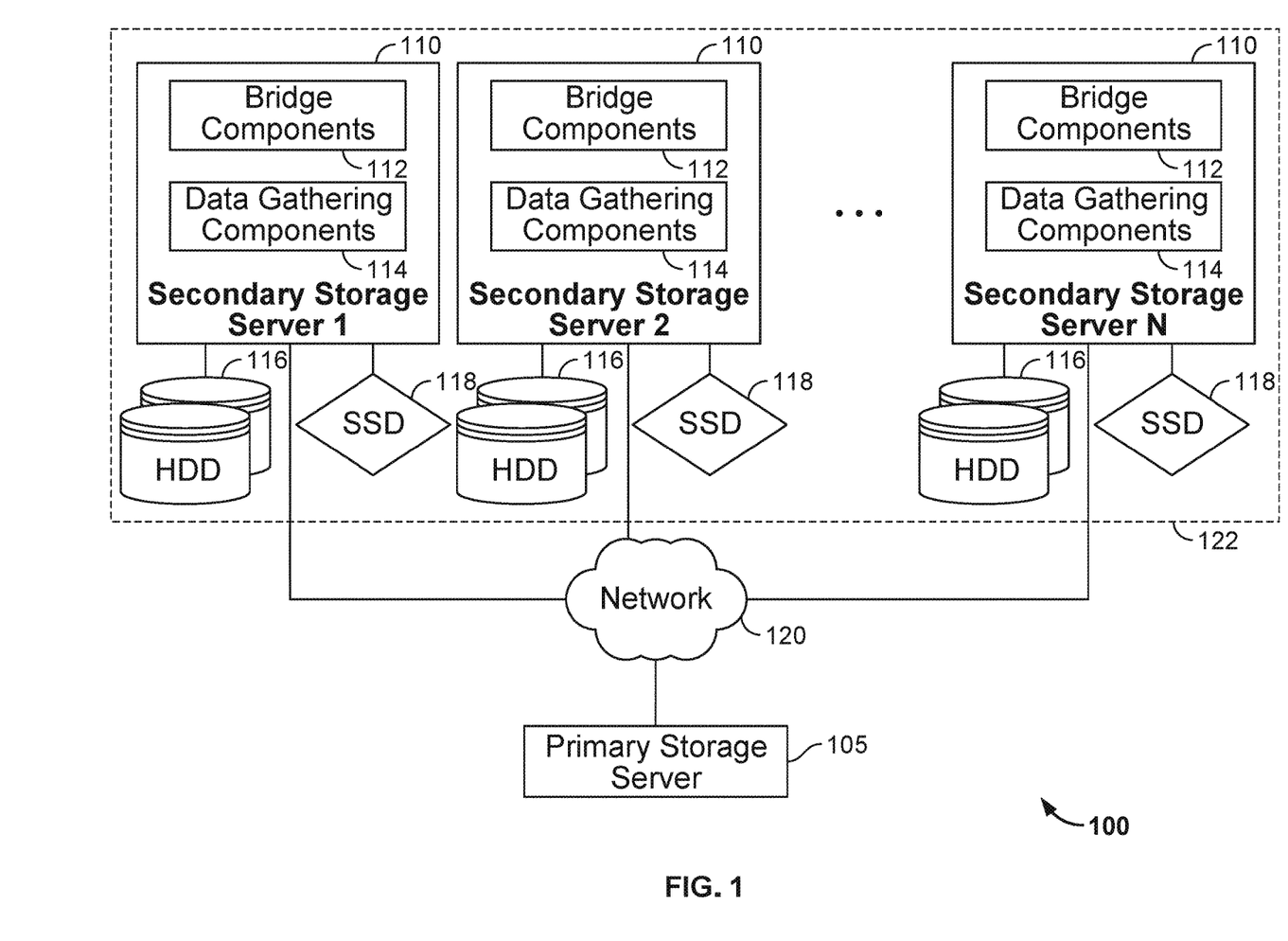
FIG. 1 illustrates an example computing environment, according to one embodiment.

FIG. 1 illustrates an example computing environment 100, according to one embodiment. As shown, the computing environment includes a primary storage server 105 and a distributed cluster 122. The distributed cluster 122 includes multiple computing servers 110 configured to host and manage a service (e.g., secondary storage services). The primary storage server 105 and secondary storage servers 110 are each connected via a network 120. The primary storage server 105 and secondary storage servers 110 may provide storage for a large data center.

In this example embodiment, secondary storage servers 110 provide backup storage and services to the primary storage server 105. The backup services may be workloads for copying data to tape disks, moving data to a cloud provider, and performing test and development tasks using a clone of the backup data. As shown, each secondary storage server 110 (or "node") includes bridge components 112 and data gathering components 114. The bridge components 112 may provide modules that allow external clients with access to each node. The data gathering components 114 provide modules that retrieve primary storage server 105 (e.g., by communicating with the primary storage server 105 using a backup protocol). Further, each node includes one or more hard disk drives (HDDs) 116 and solid-state drives (SSDs) 118 for storing data from primary storage server 105. The SSDs 118 increase the performance running secondary storage transactions, such as serial-write transactions.

Figure 2:
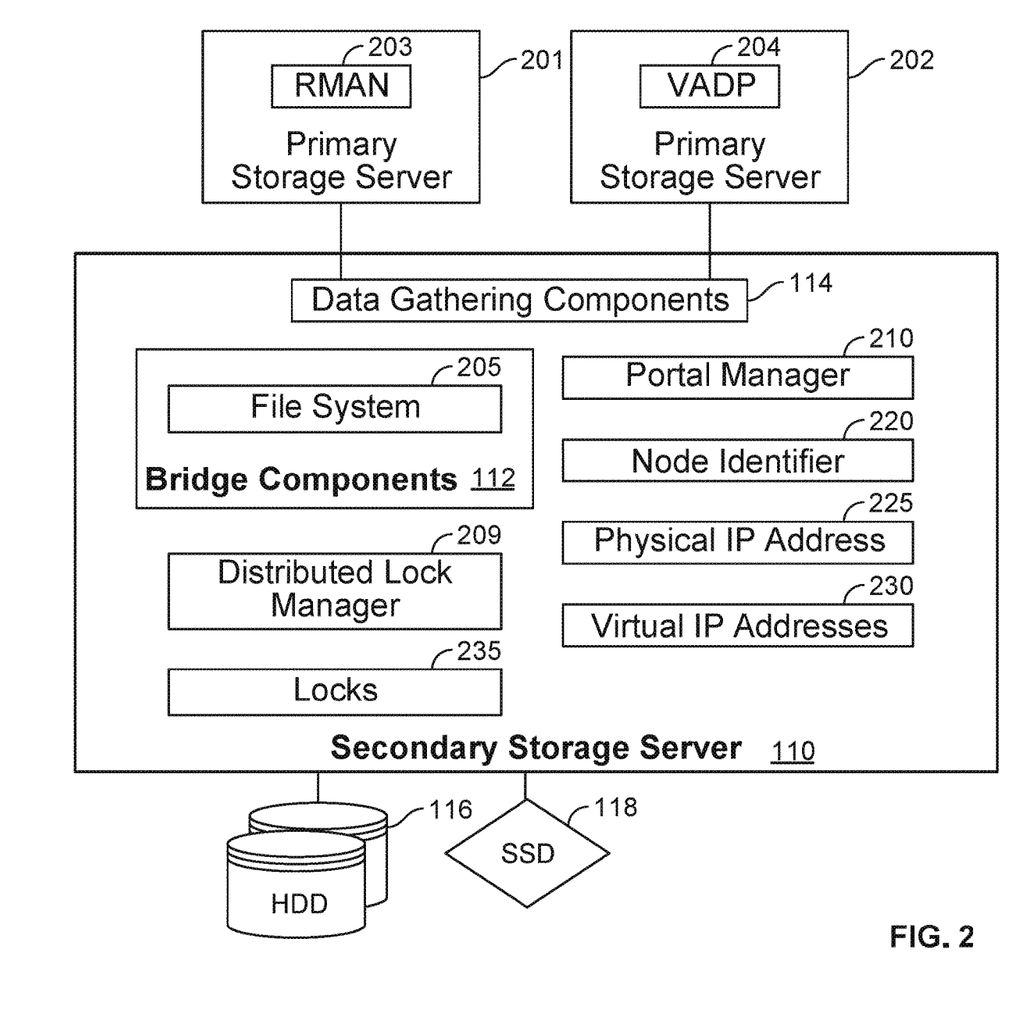
FIG. 2 illustrates an example secondary storage server configured to accept or reject locks to virtual IP addresses, according to one embodiment.

FIG. 2 further illustrates an example secondary storage server 110, according to one embodiment. As shown, the secondary storage server 110 includes bridge components 112, data gathering components 114, a portal manager 210, a management component 215, a node identifier 220, a physical IP address 225, one or more virtual IP (VIP) addresses 230, and one or more locks 235 associated with the VIP addresses 230.

As stated, the data gathering components 114 may communicate with primary storage servers in the computing environment 100. To do so, the data gathering components 114 may include adapters specific to communicating with backup protocols hosted on primary storage servers. Illustratively, the data gathering components 114 may retrieve data from primary storage servers 201 and 202, where each primary storage server 201 and 202 execute backup protocols such as recovery manager (RMAN) 203 and vStorage APIs for Data Protection (VADP).

The bridge components 112 include a file system 205. The file system 205 collaborates with the file systems of other secondary storage servers in the cluster to form a distributed system used to store backup data from the primary storage service 201. Further, the bridge components 112 may expose file system 205 to various clients through file system protocols, such as NFS. The portal manager 210 may provide an interface to the file system (e.g., by providing an NFS mount point). The clients may access the file system 205 by sending requests to the cluster. A DNS server load balances the requests and sends the requests to nodes by resolving a hostname to a VIP address 230 for each request.

The secondary storage server 110 may include a distributed lock manager service (DLMS) 209. In one embodiment, the nodes in the cluster elect a leader that issues locks for resources (e.g., VIP addresses 230) to requesting nodes. In response to receiving a request from a node for a lock, the DLMS 209 that acts as a leader enters the request in a queue for that lock.

The node identifier 220 is a distinct value that may be based on the MAC address of the secondary storage server 110. In one embodiment, each node may generate a sorted list of the node identifiers to use in the fairness algorithm. Further, the physical IP address 225 is an actual network address used by a secondary storage server 110 on the network 120. Other nodes in the cluster may communicate and perform transactions with the secondary storage server 110 via the physical IP address 225. The VIP addresses 230 may be allocated to the secondary storage server 110 through the DLMS 209. The allocation methods are further described below.

Figure 3:
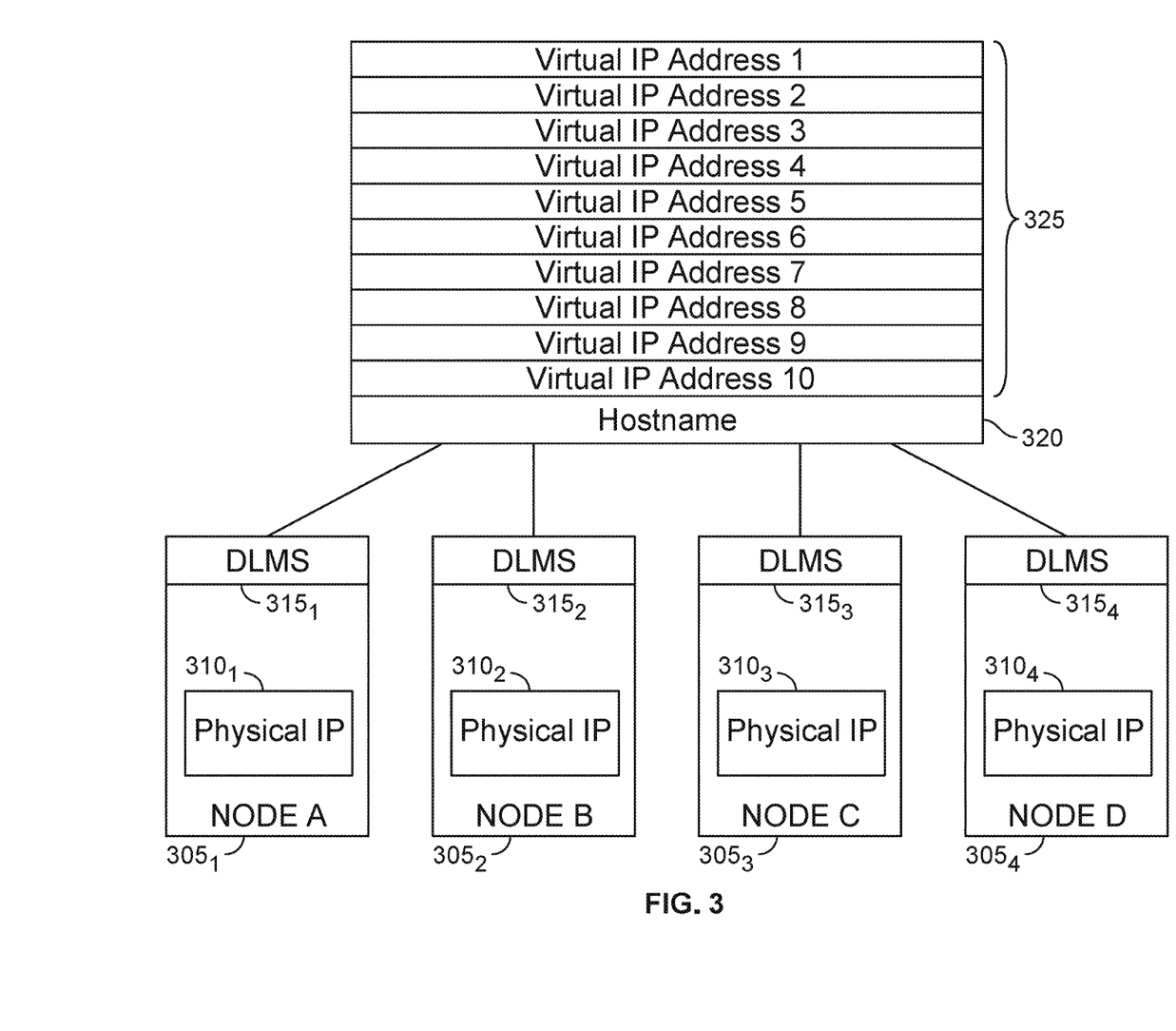
FIG. 3 illustrates an example of virtual IP addresses allocated to nodes in a cluster, according to one embodiment.

FIG. 3 illustrates an example of virtual IP (VIP) addresses allocated to nodes in a cluster, according to one embodiment. A DNS server in the computing environment 100 uses DNS records to resolve a hostname 320 to a network address. Further, the requests addressed to the hostname 320 may be load-balanced to one or more VIP addresses 325. The hostname or fully qualified domain name (FQDN) may correspond to a particular service of the distributed secondary storage system. Illustratively, requests addressed to the hostname 320 are load-balanced to ten VIP addresses, labeled from 1-10.

Illustratively, four nodes $305_{1-4}$, labeled Node A-D, form the secondary storage cluster. Each node 305 includes a physical IP $310_{1-4}$ and distributed lock management service (DLMS) $315_{1-4}$. The DLMS issues locks for VIP addresses 325 to nodes requesting the locks. To do so, the DLMS 315 manages locks for the VIP addresses so that only one node is responsible for a given VIP address 325 at any given time.

To acquire a lock for a given VIP address, a node 305 requests a lock for that VIP address from the DLMS $315_{1-4}$ elected to act as the leader. In response, the DLMS $315_{1-4}$ adds the node to a queue for each lock. The DLMS 315 distributes locks to the nodes at the front of each queue. When a node receives a lock, the node 305 determines whether to accept the lock based on a fairness algorithm performed to determine a maximum number of locks performed by each node to determine how many locks that node can hold simultaneously at any given time. The fairness algorithm is described in detail relative to FIG. 5.

Figure 4:
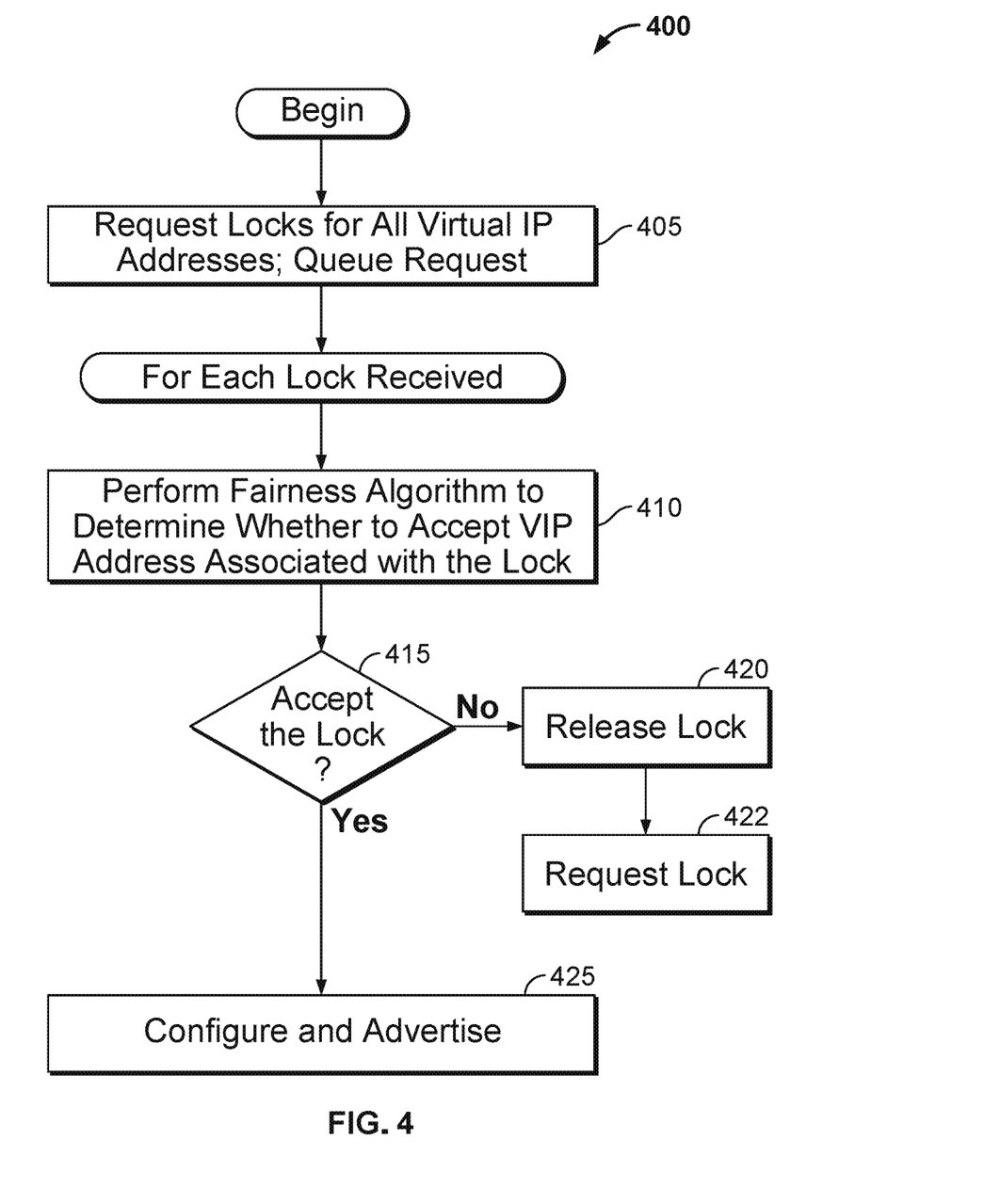
FIG. 4 illustrates a method for allocating virtual IP addresses to a computing node in a cluster, according to one embodiment.

FIG. 4 illustrates a method 400 for allocating VIP addresses to nodes in a cluster, according to one embodiment. Method 400 begins at step 405, where each node requests locks for all VIP addresses assigned to a hostname. The DLMS stores each request in first-in first-out (FIFO) queue. Note, each VIP address has its own queue. In turn, the DLMS issues locks for each VIP address to the node at the front of the queue. For example, consider a cluster with ten VIP addresses and nodes A-D. If all ten VIP addresses are available (e.g., during an initial configuration of the cluster), Node A may receive all ten VIP addresses, and the requests made by Nodes B-D may each be placed in the queue.

For each VIP address lock received from the DLMS, the node performs the following steps. At step 410, the node performs a fairness algorithm to determine whether to accept the lock (and ultimately to receive network traffic load-balanced to that VIP address). The fairness algorithm identifies a maximum number of VIP addresses that the node will accept, given the current membership of the cluster. At step 415, the node determines whether to accept the lock on the VIP address. At step 420, if accepting the VIP address causes the node to exceed the maximum number of locks, then the node releases the lock. Once released, the DLMS may issue a lock for that VIP address to the next node in the queue. Typically, once a node obtains a lock, the node will retain a lock until it fails. However, at step 422, if for any reason the node releases the lock, the node may re-request the lock from the DLMS upon release. In response, the DLMS places the request in the queue for the lock.

At step 425, if the node accepts the lock on the VIP address, the node configures the VIP address. The node also advertises to the cluster that the node has the VIP address, e.g., by sending a gratuitous address resolution protocol (ARP) announcement. Doing so allows the network routing and switching systems to associate a local Ethernet port with the VIP address.

Figure 5:
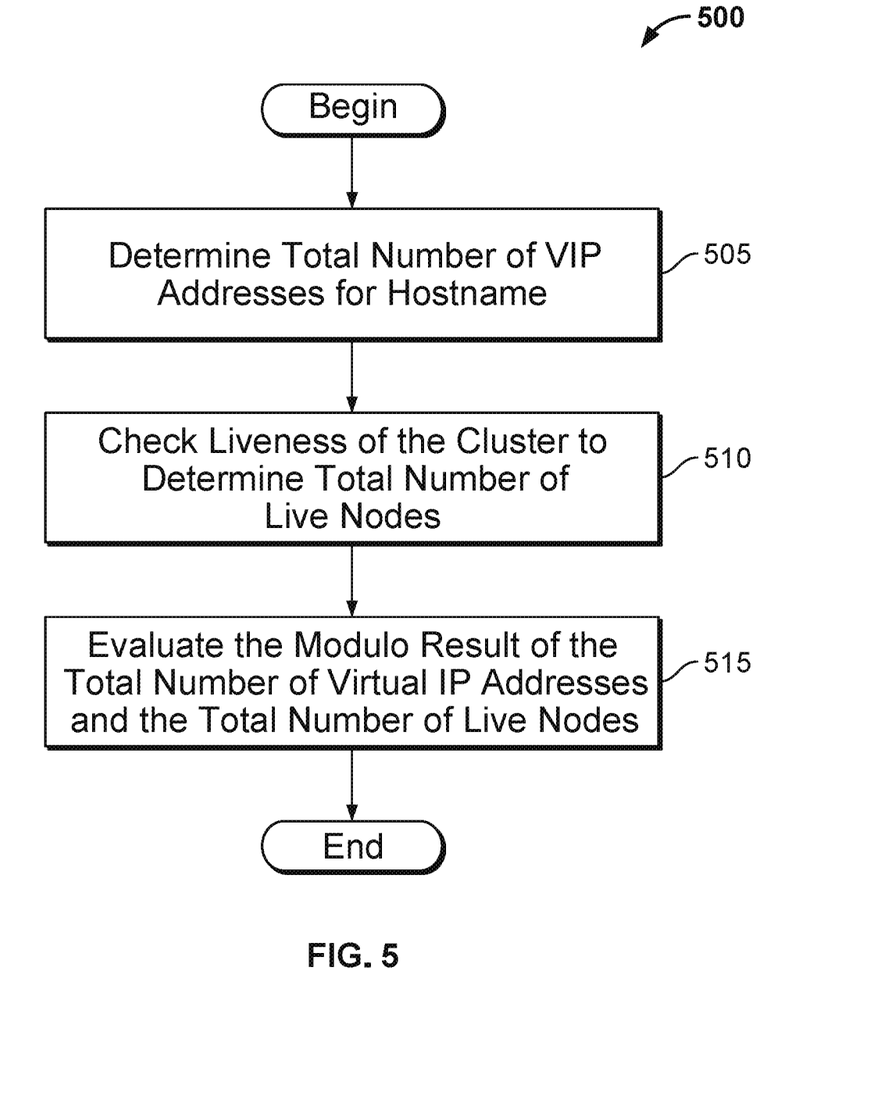
FIG. 5 illustrates a method for determining a fairness allocation in a distributed secondary storage network, according to one embodiment.

FIG. 5 illustrates a method 500 for performing the fairness algorithm discussed above, according to one embodiment. As stated, the fairness algorithm identifies how many VIP addresses a node will accept based on the number of nodes in the cluster and number of VIP addresses.

Method 500 begins at step 505, where a node determines the total number of VIP addresses for a given hostname. The node may obtain such information from DNS records for the hostname. Continuing the previous example, assume the node determines that a given hostname has ten VIP addresses.

At step 510, the node determines the total number of live nodes present in the cluster. The node may do so by determining how many nodes are online. In one embodiment, the DLMS may execute a "liveness" service that detects whether the node membership. Further, the "liveness" service may notify the nodes in the cluster when one of the nodes has gone offline. Also, a node may query the "liveness" service to determine whether a node has failed. In one embodiment, the cluster may require consensus before concluding that a node has failed (e.g., a majority of nodes detecting, via the respective "liveness" services on each node, that one of the nodes has failed). In this case, assume the node of the continuing example determines that four nodes are present in the cluster and no nodes have gone offline.

At step 515, the node determines the maximum number of VIP addresses that the node may accept. The node may do so by evaluating the following formula:

$$\text{Maximum amount of VIP addresses} = M/N \quad (1),$$

where M is the total number of VIP addresses and N is the total number of nodes in the cluster. However, if M is not a multiple of N, equation (1) yields a remainder, specifically:

$$\text{Amount of remaining nodes} = M\%N \quad (2),$$

where % is the modulo operator. As stated, the nodes may be ordered sequentially list for the fairness algorithm (e.g., by node identifier). That is, the fairness algorithm specifies that the first M % N nodes listed may accept one of the remaining M % N VIP address locks.

Figure 6:
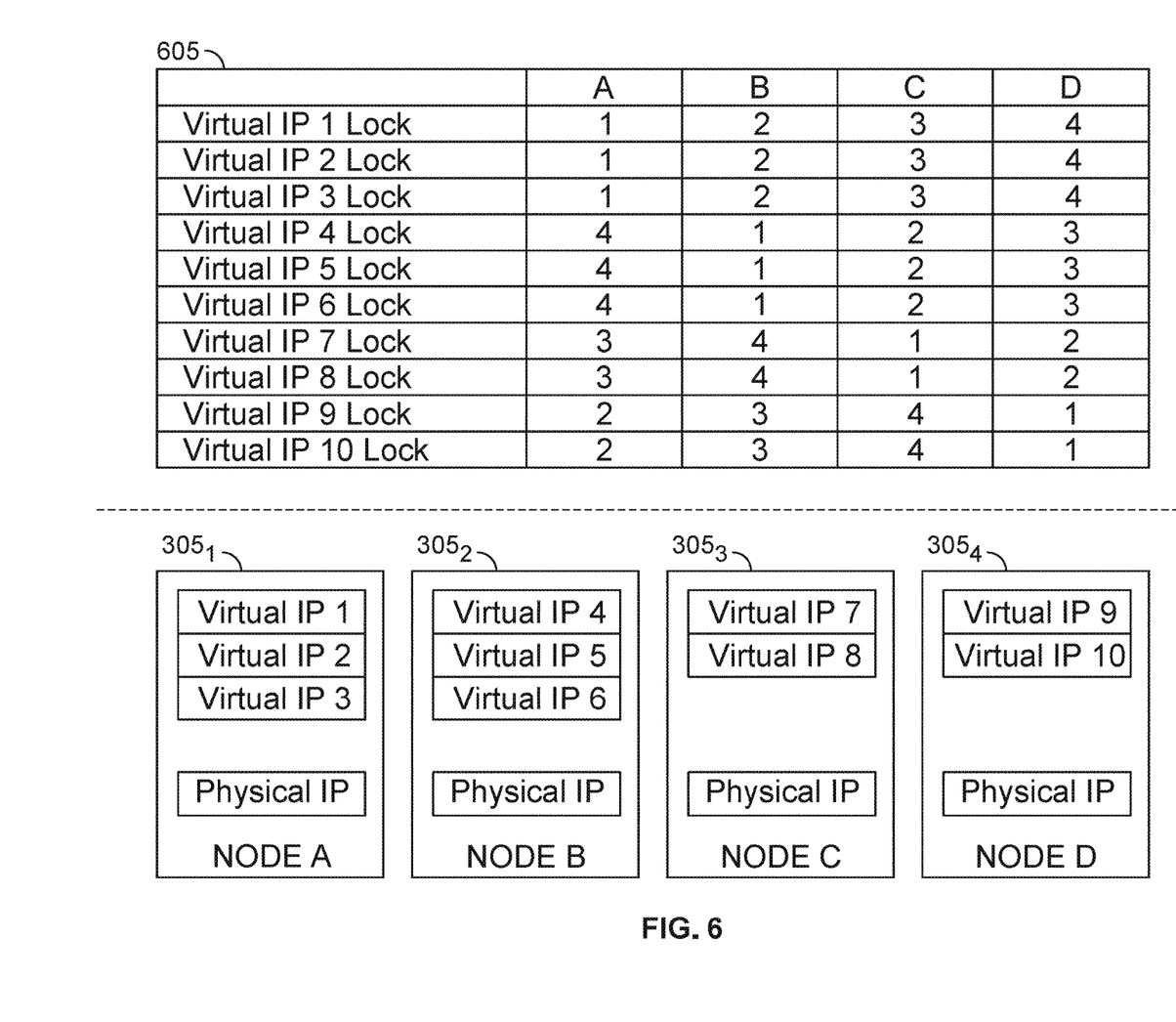
FIG. 6 illustrates an example of virtual IP addresses allocated to nodes in a cluster, according to one embodiment.

FIG. 6 illustrates VIP address locks allocated to nodes in a cluster, according to one embodiment. FIG. 6 continues the example of the ten VIP addresses and four nodes A-D discussed above. As shown, FIG. 6 includes a first-in first-out (FIFO) queue chart 605. The rows of queue chart 605 list the ten VIP address locks in sequential order. The columns of queue chart 605 list the four nodes A-D in sequential order. The numbers 1-4 listed in each row/column position indicate the position in the queue chart 605 that a given node has for a given VIP address lock.

Further, the portion below the dotted line illustrates the allocation of the VIP addresses based on the queue chart 605. As shown, Node A has VIP addresses 1-3, Node B has VIP addresses 4-6, Node C has VIP addresses 7-8, and Node D has VIP addresses 9-10. Such allocation is consistent with the fairness algorithm described. Specifically, given ten VIP addresses and four cluster nodes, each node should have at least two VIP addresses (i.e., M/N amount of VIP addresses), and the first M % N nodes listed by the DLMS should have the remaining M % N VIP addresses.

As an example of how the VIP addresses were allocated, consider Node A. Node A requests locks for all ten VIP addresses. The DLMS places Node A first in the queue for each VIP address lock. Because Node A is at the front of the queue for each lock, the DLMS distributes all ten VIP address locks to Node A.

For each lock, Node A performs the fairness algorithm described above. Based on the result of the fairness algorithm, Node A may maintain a maximum amount of three VIP addresses. Therefore, Node A accepts the first three locks. Because Node A is unable to accept the remaining seven VIP address locks, node A releases the locks and subsequently re-requests the locks from the DLMS. In turn, the DLMS distributes the locks to the next node in the queues (i.e., node B in this example), and places the requests by node A at the end of the queues. Nodes B-D undergo the same process. Queue chart 605 depicts the positions of each node after each VIP address has been allocated to the nodes. Note, the example above is simplified to demonstrate how locks are allocated to nodes in a cluster. In practice, it is possible that requests for the locks from the nodes are received in any order. Consequently, the nodes may accept and release the locks in several iterations before the distribution above ultimately occurs.

Figure 7:
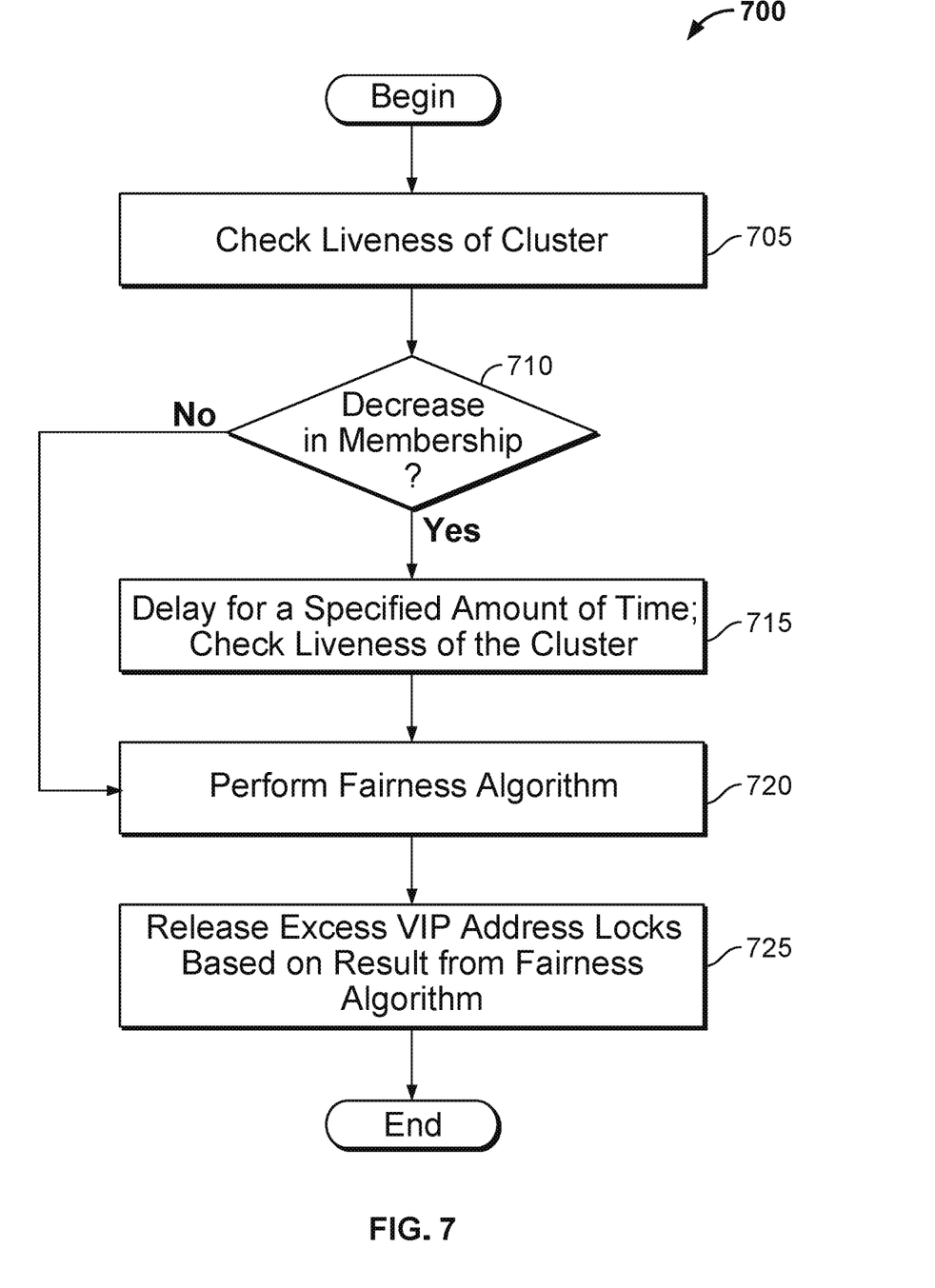
FIG. 7 illustrates a method for redistributing virtual IP address locks after a change in cluster size, according to one embodiment.

FIG. 7 illustrates a method 700 for redistributing VIP address locks after a change in cluster size, according to one embodiment. In one embodiment, after a node in the cluster fails, the DLMS issues a lock to the next node in the queue for each lock held by the failed node.

A node may receive a lock as a result of another node (or process on that node) failing or restarting. If a node receives a lock for a given VIP address, then at step 705, the node checks the liveness of the cluster. If a node has failed, then a liveness check results in a decrease in membership. At step 710, if the liveness check indicates a decrease in membership, then, at step 715 the current node waits for a specified period of time (e.g., a few seconds) before deciding whether to retain a lock.

After the period elapses, the node again checks the liveness of the cluster to determine whether the node that failed has returned to the cluster (at step 715). At step 720, the current node performs the fairness algorithm. If the previously offline node has returned to the cluster, then the node should determine that accepting the lock (following the brief delay) would exceed the number of addresses which that node can maintain based on the fairness algorithm.

Accordingly, at step 725, the current node releases the excess VIP address lock. The current node does so in a last-in first-out (LIFO) order. Doing so allows the recovered node to ultimately reacquire the VIP addresses that the node had previously maintained, without having to explicitly track which nodes previously maintained which VIP addresses. Further, delaying the fairness algorithm check after detecting a node failure allows nodes that undergo a relatively short failure (e.g., such as in a process restart) to reacquire the locks on the VIP addresses previously assigned to that node.

Figure 8:
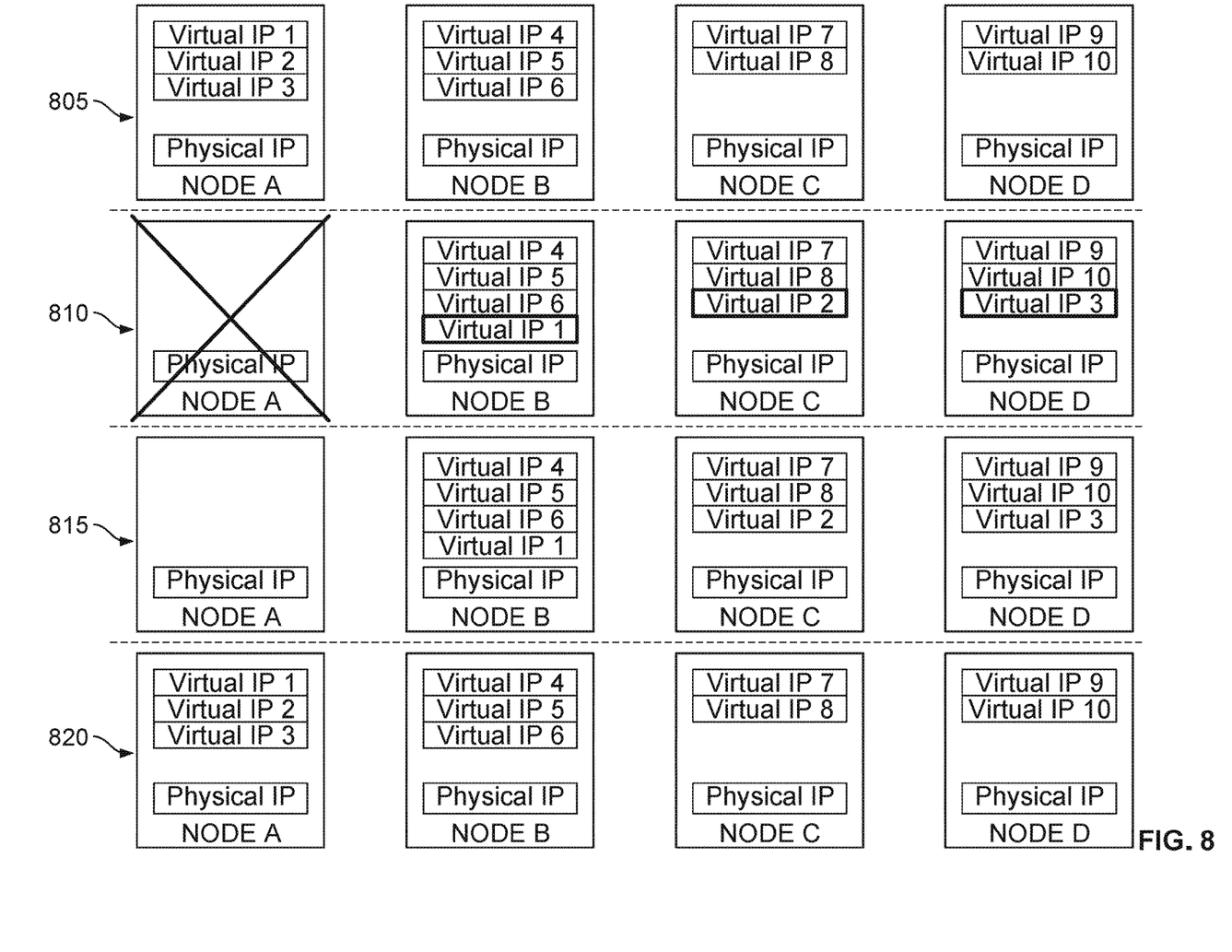
FIG. 8 illustrates an example of virtual IP addresses reallocated to nodes in a cluster, according to one embodiment.

FIG. 8 illustrates an example of VIP addresses reallocated to cluster nodes after a node failure, according to one embodiment. At 805, nodes A-D are online in the cluster. As shown, Node A has VIP addresses 1-3, Node B has VIP addresses 4-6, Node C has VIP addresses 7-8, and Node D has VIP addresses 9-10.

At 810, node A fails (as indicated by bolded crossing lines over node A). When this occurs, the DLMS issues the locks to the next node in the queue for each lock. Assume that in this case, that queue chart 605 is representative of the VIP address lock queue. Based on the fairness algorithm, Node B can have four VIP addresses. As a result, Node B accepts VIP address 1 (as shown by the bolded rectangle in Node B) but releases the locks for VIP addresses 2 and 3. Likewise, Node C can have three VIP addresses, and therefore accepts VIP address 2 and releases the lock for VIP address 3. Node D, in turn, receives the lock for VIP address 3 and accepts the VIP address. However, prior to configuring and advertising the newly-acquired VIP addresses, each nodes delay for a specified amount of time.

At 815, Node A returns to the cluster after a short period of time. Assume that the period is within the specified delay period for recoverable failures. Illustratively, Node A has no VIP addresses assigned, and therefore the allocation of VIP addresses to the cluster nodes is uneven. Node A places a request for all VIP addresses, and in turn, the DLMS places Node A in a queue for each VIP address. After delaying for a specified amount of time, Nodes B-D perform a liveness check. By doing so, the Nodes B-D detect that the cluster size has returned to what it was previously. Thereafter, Nodes B-D perform the fairness algorithm and release any excess locks to VIP addresses in a last-in first-out (LIFO) order. Further, the Nodes B-D resubmit requests for each of the VIP addresses released by that node. For example, Node B releases the lock for VIP address 1 and subsequently requests the lock from the DLMS. Doing so effectively places Node B at the end of the queue for the VIP address 1 lock.

At 820, Node A has reacquired VIP addresses 1-3. Releasing the locks in a LIFO order allows a node that quickly recovers from a failure to reacquire the VIP addresses that the node had previously maintained.

Figure 9:
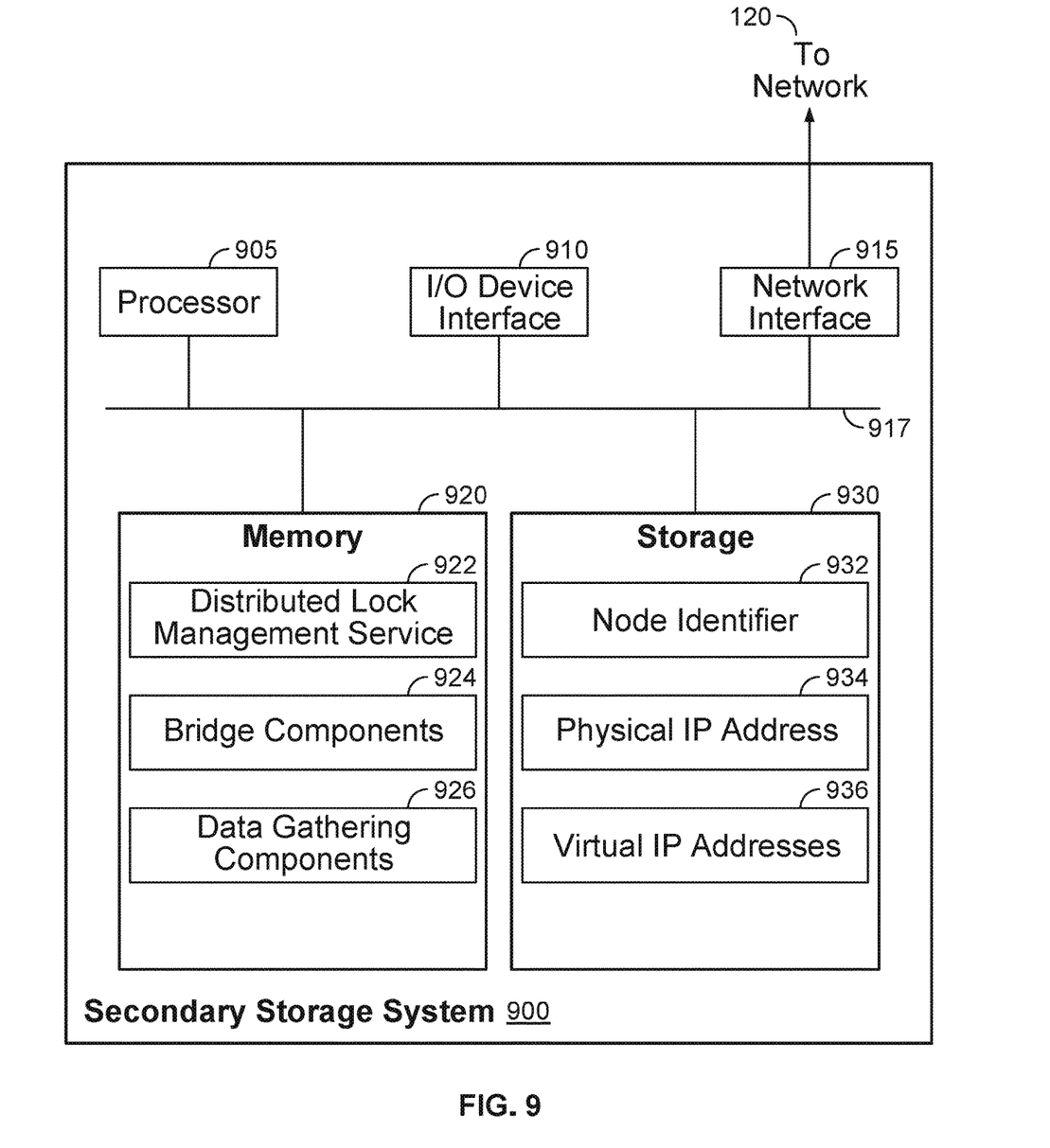
FIG. 9 illustrates a secondary storage server configured, according to one embodiment.

FIG. 9 illustrates an example secondary storage server 900 configured to allocate VIP addresses among other secondary storage servers in a distributed system, according to one embodiment. As shown, computing system 900 includes, without limitation, a central processing unit (CPU) 905, a network interface 915, a memory 920, and storage 930, each connected to a bus 917. Server 900 may also include an I/O device interface 910 connecting I/O devices 912 (e.g., keyboard, display and mouse devices) to the computing system 900. Further, in context of this disclosure, the computing elements shown in computing system 900 may correspond to a physical computing system (e.g., a system in a data center) or may be a virtual computing instance executing within a computing cloud.

CPU 905 retrieves and executes programming instructions stored in memory 920 as well as stores and retrieves application data residing in the storage 930. The bus 917 is used to transmit programming instructions and application data between CPU 905, I/O devices interface 910, storage 930, network interface 915, and memory 920. Note, CPU 905 is included to be representative of a single CPU, multiple CPUs, a single CPU having multiple processing cores, and the like. Memory 920 is generally included to be representative of a random access memory. Storage 930 may be a disk drive storage device. Although shown as a single unit, storage 930 may be a combination of fixed and/or removable storage devices, such as fixed disc drives, removable memory cards, or optical storage, network attached storage (NAS), or a storage area-network (SAN).

Illustratively, memory 920 includes a distributed lock management service (DLMS) 922, bridge components 924, and data gathering components 926. The DLMS 922 is a distributed process that manages locks to resources that are shared in the cluster, such as virtual IP addresses 936. The bridge components 924 provide a file system architecture for the distributed secondary storage system. The data gathering components 926 allow the secondary storage server 900 to communicate with primary storage servers and retrieve data from the primary storage servers.

The storage 930 includes a node identifier 932, a physical IP address 934, and virtual IP addresses 936. Nodes in the distributed secondary storage cluster may identify each member of the cluster, i.e., of the secondary storage server 900 by the node identifier 932. Further, the node identifier 932 may be included in a sorted list. The secondary storage server 900 may use the list in the fairness algorithm to determine whether to accept or release a lock. In addition, other nodes in the cluster may communicate with the secondary storage server 900 using the physical IP address 934. The virtual IP addresses 936 are assigned to the secondary storage server 900 by the DLMS 922. Doing so allows requests to be addressed to the "cluster" as a whole, but have the requests load balanced across virtual IP addresses by the DNS server.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   receiving, at a first node of a cluster, a lock associated with a virtual internet protocol address as a result of a second node of the cluster going offline;
   determining a decrease in a membership of the cluster;
   waiting a specified period of time to preserve the lock associated with the virtual internet protocol address on behalf of the second node if the second node returns to the cluster before deciding whether to retain the lock associated with the virtual internet protocol address;
   determining that the second node of the cluster has returned to the cluster after the specified period of time has lapsed;
   determining that accepting the lock associated with the virtual internet protocol address would exceed a limit number of virtual internet protocol addresses for the first node associated with a fairness allocation protocol; and
   releasing, based on determining that accepting the lock would exceed the limit number of virtual internet protocol addresses, the lock associated with the virtual internet protocol address.

2. The method of claim 1, wherein the fairness allocation protocol indicates a maximum number of virtual internet protocol address that the first node is allowed to accept.

3. The method of claim 1, wherein the lock associated with the virtual internet protocol address is released in a last-in first-out order.

4. The method of claim 1, wherein the second node reacquires the lock associated with the virtual internet protocol address.

5. A computer program product, the computer program product including non-transitory computer readable storage, media storing instructions, that when executed, cause one or more processors to:
   receive, at a first node of a cluster, a lock associated with a virtual internet protocol address as a result of a second node of the cluster going offline;
   determine a decrease in a membership of the cluster;
   wait a specified period of time to preserve the lock associated with the virtual internet protocol address on behalf of the second node if the second node returns to the cluster before deciding whether to retain the lock associated with the virtual internet protocol address;
   determine that the second node of the cluster has returned to the cluster after the specified period of time has lapsed;
   determine that accepting the lock associated with the virtual internet protocol address would exceed a limit number of virtual internet protocol addresses for the first node associated with a fairness allocation protocol; and
   release, based on determining that accepting the lock would exceed the limit number of virtual internet protocol addresses, the lock associated with the virtual internet protocol address.

6. The computer program product of claim 5, wherein the fairness allocation protocol indicates a maximum number of virtual internet protocol address that the first node is allowed to accept.

7. The computer program product of claim 5, wherein the lock associated with the virtual internet protocol address is released in a last-in first-out order.

8. The computer program product of claim 5, wherein the second node reacquires the lock associated with the virtual internet protocol address.

9. A system, comprising:
   a processor configured to:
      receive, at a first node of a cluster, a lock associated with a virtual internet protocol address as a result of a second node of the cluster going offline;
      determine a decrease in a membership of the cluster;
      wait a specified period of time to preserve the lock associated with the virtual internet protocol address on behalf of the second node if the second node returns to the cluster before deciding whether to retain the lock associated with the virtual internet protocol address;
      determine that the second node of the cluster has returned to the cluster after the specified period of time has lapsed;
      determine that accepting the lock associated with the virtual internet protocol address would exceed a limit number of virtual internet protocol addresses for the first node associated with a fairness allocation protocol; and
      release, based on determining that accepting the lock would exceed the limit number of virtual internet protocol addresses, the lock associated with the virtual internet protocol address; and
   a memory coupled to the processor and configured to provide the processor with instructions.

10. The system of claim 9, wherein the fairness allocation protocol indicates a maximum number of virtual internet protocol address that the first node is allowed to accept.

11. The system of claim 9, wherein the second node reacquires the lock associated with the virtual internet protocol address.

* * * * *